March 1, 1966        E. F. PETERSON        3,237,896
MOUNTING MEANS FOR VIBRATORS AND THE LIKE
Filed Aug. 1, 1963
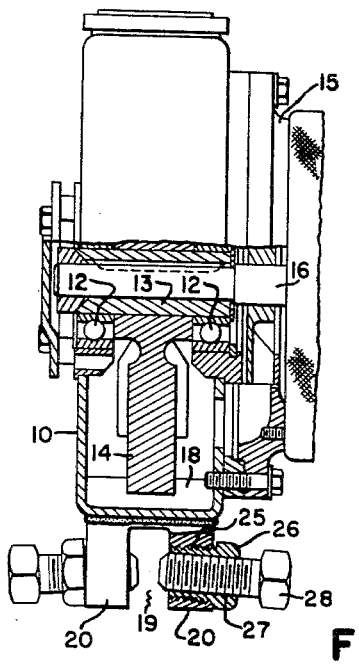
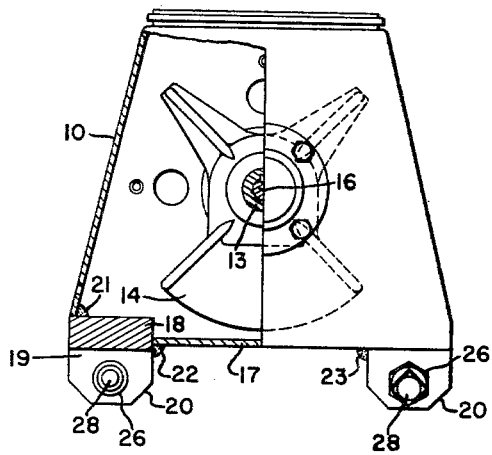
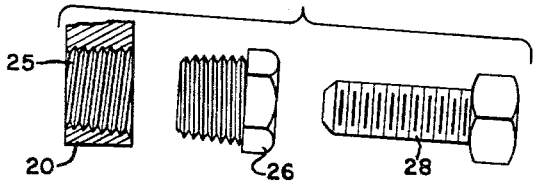
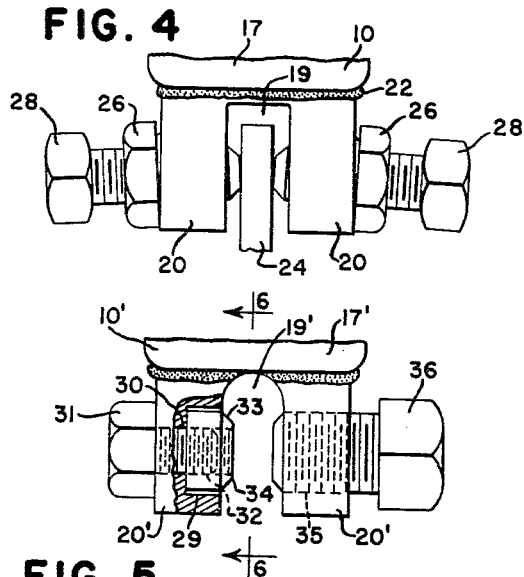
INVENTOR.
E. F. PETERSON
BY
ATTORNEY

United States Patent Office

3,237,896
Patented Mar. 1, 1966

3,237,896
MOUNTING MEANS FOR VIBRATORS AND
THE LIKE
Edwin F. Peterson, c/o Martin Eng. Co., Neponset, Ill.
Filed Aug. 1, 1963, Ser. No. 299,400
1 Claim. (Cl. 248—14)

This application is a continuation-in-part of my co-pending Serial No. 104,335, filed Apr. 20, 1961, now Patent 3,177,731.

This invention relates to mounting means and more particularly to improvements in mounting means for vibrators and like mechanisms.

Those versed in the art are familiar with the aims, functions and purposes of vibrator mechanisms in expediting the movement of fluent material in the materials-handling field, and from this it will be appreciated that these mechanisms are subjected to relatively heavy duty service over considerable periods of time. At the same time, it is quite frequently desirable that the vibrator be portable so that it may be moved from object to object or container to container, and for this reason it must be easily handled, must be relatively light yet have a substantially high strength-to-weight ratio, and the mounting means must be suitable for readily mounting it on and detaching it from such objects or containers to be vibrated. Heretofore, mounting means in this area were unsatisfactory because of their inability to resist loosening during operation of the vibrator, and in many cases mounting was accomplished by temporarily welding the vibrator in place. This, obviously, is time-consuming, costly and inefficient. The failure of most prior art mounting means is due to lack of competent design, inability of the clamping forces to withstand deterioration in use, and in general a lack of adequate clamping devices.

The present invention has for a principal object the provision of an improved mounting means which overcomes the foregoing difficulties and at the same time renders the vibrator completely portable, inasmuch as the clamping means may be used over and over again without undue wear and deterioration. It is a feature of the invention to provide the mounting means in the form of inserts which themselves carry threaded members, thereby enabling ready replacement and repair where necessary. An important feature of the invention resides in the arrangement of opposed clamping means operating on generally alined axes that are inclined to a common plane so that when the clamping forces are exerted by tightening the screw-threaded means, the supports therefor will tend to straighten and become parallel to the plane of the rib or other object to which the mechanism is attached.

The foregoing and other important objects and desirable features inherent in and encompassed by the invention will become apparent as a preferred embodiment of the invention, together with a modification thereof, is disclosed in detail in the accompanying description and accompanying sheet of drawings, the figures of which are described below.

FIG. 1 is a fragmentary view, partly in section, illustrating a typical vibrator with one form of the improved mounting means thereon.

FIG. 2 is a reduced elevation, partly in section, of the structure shown in FIG. 1.

FIG. 3 is an enlarged "exploded" view of the components of one clamping device.

FIG. 4 is an elevation, on a scale enlarged over that of FIG. 1, illustrating the clamping devices used in opposition for clamping the vibrator housing to a supporting rib or the like.

FIG. 5 is a view similar to FIG. 4, and partly in section, but illustrating another form of clamping or mounting means.

FIG. 6 is a fragmentary section taken generally on the line 6—6 of FIG. 5.

The vibrator may be of the type shown in my U.S. Patent 3,076,346, and as further shown in my co-pending application identified above. Such vibrator will comprise essentially a casing or housing 10 having spaced apart side walls within which are coaxially mounted a pair of bearings 12 for journaling a tubular shaft 13 on which is eccentrically mounted a weight 14. Any sort of drive means, external to the housing 10, may be utilized to rotate the shaft 13 and consequently the weight 14. In the present case, an electric motor, represented by the numeral 15 has a drive shaft 16 keyed in any suitable fashion to the vibrator shaft 13.

The vibrator casing 10 is closed at its bottom to form what may be regarded as base structure 17 rigidly secured at opposite ends to blocks 18, each of which is cut out or formed with a groove or gap 19 so as to provide a pair of spaced apart legs 20. The blocks 18 may be integrated with the casing 10 as by welding at 21, 22 and 23. As will be seen, there are two pairs of legs 20, 20 and these are spaced apart on the median plane of the vibrator, the rotating axis of the shaft 13 of which is perpendicular or transverse to said plane. The gap 19 is adapted to receive a rib or receiving element 24 (FIG. 4) which is commonly provided on hoppers, containers and other objects to which the vibrator is mountable and from which the vibrator is detachable. In other words, the legs of each pair straddle the element 24.

The foregoing affords an improved mounting arrangement, which exploits the circumstance that when the two legs of each pair are clamped in position, they will tend to spread apart to the limited extent, because of the inherent bending available in the material of which they are made. Therefore, each leg is provided with a tapped bore 25 having its axis inclined outwardly and downwardly (FIGS. 1, 3 and 4). The two axes of the tapped bores respectively in the legs 20 are outwardly divergent; although, they are directly opposed at opposite sides of the rib 24. Each tapped bore 25 receives a relatively hard steel insert 26 which itself is internally threaded at 27 to receive a set screw 28. When a set screw or insert wears because of use, it may be readily replaced.

FIG. 4 illustrates the situation just before the set screws 28 are tightened, and the axes of the set screws will be in divergent relation as described above. It will be seen that as the set screws are tightened, the forces exerted thereby tend to spread the legs 20 at their free ends, thus bringing the divergent axes coaxial or substantially so. This results in the condition that when the set screws are tightened, their element engaging faces are flush with the opposite sides of the element rather than having only a semi-circular bite, as would be the case were the axes coaxial before tightening of the set screws.. Because of the extra rigid construction of the mounting means, the spreading of the legs will be found to be somewhat limited and the initial divergence of the axes will accommodate even the most extreme conditions in usage without deterioration.

In that form of the invention shown in FIGS. 5 and 6, two legs 20' similar to those above, are formed as part of the face structure 17' of a vibrator casing 10'. One difference is that one of the legs 20' is afforded at its inner face, opening to the gap or space 19', with a recess 29 which is a counterbore with a smaller bore 30 through which a cap screw 31 is passed to be threaded at 32 into a hardened steel insert having a truncated conical element-engaging inner face 34.

The other of the legs 20' has a tapped bore 35 into which is threaded a set screw 36 axially opposite the insert 33. When the vibrator casing 10' is mounted on an element such as that at 24, the portion 34 of the insert 33 engages one side of such element and the end of the set screw 36 engages the other side, whereupon an adequate clamping force can be applied. The axes of the set screw 36 and of the components 31–33 may be divergent as in the case above.

Features and advantages other than those enumerated above will readily occur to those versed in the art, as will many modifications and alterations in the preferred embodiments disclosed, all of which may be achieved without departure from the spirit and scope of the invention.

What is claimed is:

Mounting means for a vibrator of the class described including base structure having rigid thereon a pair of relatively heavy spaced and opposed legs adapted to straddle an object having opposite flat sides, each leg having inner and outer faces and an internally threaded through bore and said bores being opposed to each other at opposite sides of said straddled object; a pair of similar externally threaded inserts, one threaded into each leg bore from the outer face thereof and having an inner terminal end terminating substantially at the associated leg inner face so as to be clear of the straddled object, each insert having a wrench-receiving outer end outwardly of the associated leg outer face, each insert further having an internally threaded through bore; a pair of similar screws threaded respectively inwardly into and through the insert bores and respectively having inner ends projecting inwardly beyond the inner ends of the inserts for engagement with respective opposite sides of the straddled object, each screw having a wrench-receiving outer end outwardly beyond the outer end of its insert; and said leg and insert bores being so arranged that the screws are initially substantially coaxially opposed but have their axes substantially symmetrically inclined at angles of less than 90° to the respective sides of the straddled object so that when the screws are tightened in opposition to apply clamping pressure to the straddled object the legs tends to spread and the axes of the screws become coaxial and perpendicular to said object sides.

References Cited by the Examiner
UNITED STATES PATENTS

| | | | |
|---|---|---|---|
| 869,086 | 10/1907 | Hoffman | 85—1 |
| 1,607,098 | 11/1926 | Noga | 248—226.1 |
| 1,609,446 | 12/1926 | Tormey | 248—228 |
| 1,678,990 | 7/1928 | Mansfield | 248—226.1 |
| 2,600,893 | 6/1952 | Mariani | 248—226.1 X |

FOREIGN PATENTS 524,785  8/1940  Great Britain.

CLAUDE A. LE ROY, *Primary Examiner.*

FRANK L. ABBOTT, *Examiner.*